(12) United States Patent
Yokoyama et al.

(10) Patent No.: US 8,574,756 B1
(45) Date of Patent: Nov. 5, 2013

(54) PRISMATIC SECONDARY BATTERY

(75) Inventors: Yoshinori Yokoyama, Kasai (JP); Takayuki Hattori, Kasai (JP); Eiji Okutani, Kasai (JP); Yasuhiro Yamauchi, Kasai (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 13/551,028

(22) Filed: Jul. 17, 2012

(51) Int. Cl.
*H01M 6/12* (2006.01)

(52) U.S. Cl.
USPC .......................................... 429/185; 429/162

(58) Field of Classification Search
USPC ................................................. 429/160–186
See application file for complete search history.

(56) References Cited

U.S. PATENT DOCUMENTS

| | | | |
|---|---|---|---|
| 7,597,995 B2 * | 10/2009 | Yamauchi et al. | 429/130 |
| 2007/0117009 A1 * | 5/2007 | Yamauchi et al. | 429/160 |
| 2008/0299453 A1 | 12/2008 | Shinyashiki et al. | |
| 2009/0297940 A1 * | 12/2009 | Nansaka et al. | 429/162 |

FOREIGN PATENT DOCUMENTS

| | | |
|---|---|---|
| JP | 2008-235149 A | 10/2008 |
| JP | 2009-032640 A | 2/2009 |

* cited by examiner

*Primary Examiner* — Carlos Barcena
*Assistant Examiner* — Michael Dignan
(74) *Attorney, Agent, or Firm* — Westerman, Hattori, Daniels & Adrian, LLP (57) ABSTRACT

A prismatic secondary battery includes a flat electrode assembly including one end having stacked positive electrode substrate exposed portions and including the other end having stacked negative electrode substrate exposed portions, and includes a positive electrode collector and a negative electrode collector connected to the corresponding outermost surface in the stacking direction of the stacked positive electrode substrate exposed portions and the stacked negative electrode substrate exposed portions, respectively, by resistance welding; the positive electrode substrate and the negative electrode substrate have thicknesses different from each other; a rib of the positive electrode collector and a rib of the negative electrode collector have heights different from each other; and each leading end in the height direction of the ribs has approximately the same height.

11 Claims, 5 Drawing Sheets

PRISMATIC SECONDARY BATTERY

TECHNICAL FIELD

The present invention relates to a prismatic secondary battery best suited for forming a battery pack that is a combination of a plurality of the prismatic secondary batteries.

BACKGROUND ART

Alkaline secondary batteries typified by a nickel-hydrogen battery and nonaqueous electrolyte secondary batteries typified by a lithium ion battery are widely used as power supplies for driving portable electronic equipment such as cell phones including smartphones, portable computers, PDAs, and portable music players. In addition, alkaline secondary batteries and the nonaqueous electrolyte secondary batteries are also widely used for power supplies for driving electric vehicles (EVs) and hybrid electric vehicles (HEVs, PHEVs) and in stationary storage battery systems for suppressing the variation in output power of photovoltaic generation, wind power generation, and the like, and for peak shifts in system power in order to store electric power during the night time and to use the electric power during daytime.

In particular, the batteries for EVs, HEVs, and PHEVs and for the stationary storage battery system are required to have high capacity and high output characteristics, and hence each battery is upsized and a number of batteries are connected in series or parallel when used. To address this, in these applications, prismatic secondary batteries are generally used from the viewpoint of space efficiency. A prismatic secondary battery that further needs physical strength commonly employs, as an outer body of the battery, a metal prismatic outer body having a mouth and a metal sealing plate for sealing up the mouth.

Such a prismatic secondary battery, for example, a prismatic nonaqueous electrolyte secondary battery, is produced as follows. For example, both faces of a positive electrode substrate made from, for example, a long sheet of aluminum foil, are coated with a positive electrode active material mixture containing a positive electrode active material to prepare a positive electrode sheet. Separately, both faces of a negative electrode substrate made from, for example, a long sheet of copper foil, are coated with a negative electrode active material mixture containing a negative electrode active material to prepare a negative electrode sheet.

Next, the positive electrode sheet and the negative electrode sheet are stacked interposing a separator made from, for example, a microporous polyethylene film therebetween, and the positive electrode sheet and the negative electrode sheet are spirally wound on a cylindrical winding core while insulating the positive electrode sheet and the negative electrode sheet from each other through the separator to prepare a cylindrical wound electrode assembly. Then, the cylindrical wound electrode assembly is pressed with a pressing machine to form a flat wound electrode assembly. Next, a positive electrode collector electrically connected to the positive electrode sheet is electrically connected to a positive electrode terminal that is insulated from a sealing plate, while a negative electrode collector electrically connected to the negative electrode sheet is electrically connected to a negative electrode terminal that is insulated from a sealing plate. Then, the flat wound electrode assembly is wrapped with an insulating sheet and stored in a metal prismatic outer body; a mouth portion of the prismatic outer body is sealed with a sealing plate; an electrolyte is poured from a electrolyte pour hole provided on the sealing plate; and finally the electrolyte pour hole is sealed to produce the prismatic nonaqueous electrolyte secondary battery.

When a plurality of such prismatic secondary batteries required to have high capacity and high output characteristics are combined to form a battery pack, for example, as shown in JP-A-2008-235149 and US Patent Publication No. 2008/299453 (A1), a resin spacer having a size smaller than the outer size of the battery may be interposed between the respective batteries, and the batteries may be pressurized until the battery has a thickness not larger than a required thickness (can thickness) for containment. Moreover, for example, as shown in JP-A-2009-032640 and US Patent Publication No. 2009/297940 (A1), a prismatic secondary battery includes a collector having a rib in a battery thickness direction in order to suppress the dispersion of spattered particles generated during resistance welding when the collector is resistance-welded to a position at which a plurality of positive electrode substrate exposed portions or a plurality of negative electrode substrate exposed portions are bundled. With the prismatic secondary battery using such a collector having the rib in the battery thickness direction, the rib shields spattered particles generated during resistance welding and the spattered particles are unlikely to enter into the battery. Therefore, a prismatic secondary battery with high reliability can be obtained.

In a prismatic secondary battery, a substrate constituting a positive electrode may have a thickness different from that of a substrate constituting a negative electrode. In a prismatic secondary battery required to have high capacity and high output characteristics, the stacking number of the positive electrode substrates is approximately the same as that of the negative electrode substrates. However, each stacking number is large, resulting in a large difference in the thickness between a bundled plurality of positive electrode substrate exposed portions and a bundled plurality of negative electrode substrate exposed portions. In this case, when a positive electrode collector and a negative electrode collector each have a rib with the same height, the distance between the leading end of the rib and the prismatic hollow outer body in the positive electrode side differs from that in the negative electrode side.

When a plurality of such prismatic secondary batteries in which the distance between the leading end of the rib and the prismatic hollow outer body in the positive electrode side differs from that in the negative electrode side are combined to form a battery pack, the batteries are not uniformly depressed in a process of applying pressure to the batteries until the battery has a thickness not larger than a required thickness for containment. Thus, the produced battery pack suffers from varied length and bending.

In the prismatic secondary battery disclosed in US Patent Publication No. 2009/297940 (A1), the leading end of each of the ribs provided to the electrode collectors breaks into an insulating sheet disposed between a flat electrode assembly and a prismatic outer body, but the height of the rib is designed so that the rib does not break through the insulating sheet. However, US2009/297940 (A1) does not disclose the ribs having different heights between the positive electrode side and the negative electrode side.

SUMMARY

An advantage of some aspects of the invention is to provide a prismatic secondary battery that is uniformly depressed and can provide a battery pack with stable quality even when, in order to form a battery pack by combining a plurality of the prismatic secondary batteries, a resin spacer is interposed between the respective batteries and the batteries are pressurized until the battery has a thickness not larger than a required thickness for containment.

According to an aspect of the invention, a prismatic secondary battery includes a prismatic hollow outer body having a mouth portion, a sealing plate for sealing up the mouth portion of the prismatic hollow outer body, a flat electrode assembly including one end having stacked positive electrode substrate exposed portions, including another end having stacked negative electrode substrate exposed portions, and stored in the prismatic hollow outer body, and a positive electrode collector connected to an outermost surface in a stacking direction of the stacked positive electrode substrate exposed portions and a negative electrode collector connected to an outermost surface in a stacking direction of the stacked negative electrode substrate exposed portions. Both the positive electrode collector and the negative electrode collector have a collector main body and a rib, the rib extending in a substantially perpendicular direction with respect to the corresponding collector main body. In the prismatic secondary battery, the positive electrode substrate has a thickness different from that of the negative electrode substrate, and the rib of the positive electrode collector has a height different from that of the rib of the negative electrode collector, a leading end in the height direction of the rib of the positive electrode collector has approximately the same height as a leading end in the height direction of the rib of the negative electrode collector.

In the prismatic battery of the invention, the leading end in the height direction of the rib of the positive electrode collector has approximately the same height as the leading end in the height direction of the rib of the negative electrode collector, and this results in an equal distance between the leading end of each rib in the positive electrode side and the negative electrode side and the prismatic hollow outer body. Therefore, with the prismatic secondary battery of the invention, even when a plurality of the prismatic secondary batteries of the invention are combined and pressurized until the battery has a thickness not larger than a required thickness for containment, each prismatic secondary battery is uniformly depressed. The difference between the leading end in the height direction of the rib of the positive electrode collector and the leading end in the height direction of the rib of the negative electrode collector is preferably within 0.1 mm, and more preferably within 0.05 mm. It is further preferable that the leading end in the height direction of the rib of the positive electrode collector have the same height as the leading end in the height direction of the rib of the negative electrode collector. It is sufficient that the prismatic battery of the invention employ the above-described structure on at least one side of the flat electrode assembly.

The angle between each main body of the positive electrode collector and the negative electrode collector and the corresponding rib is preferably 90° but is not necessarily 90° and may be tilted by about ±10° from 90°. How to connect the positive electrode substrate exposed portions with the positive electrode collector and the negative electrode substrate exposed portions with the negative electrode collector is not particularly limited. Different connecting methods may be employed between the positive electrode side and the negative electrode side. The electrode substrate exposed portions is preferably connected with the corresponding electrode collector by welding, preferable examples of which include resistance welding, ultrasonic welding, and welding through application of high-energy beams, such as laser.

The prismatic battery of the invention preferably includes the positive electrode terminal and the negative electrode terminal attached to the sealing plate, the positive electrode terminal and the negative electrode terminal being electrically insulted from the sealing plate and being electrically connected to the positive electrode collector and the negative electrode collector, respectively.

The positive electrode collector and the negative electrode collector may, on one side of the respective stacked substrate exposed portions, each have a collector main body connected to the positive electrode terminal and the negative electrode terminal, respectively, and a rib; and may be, on the other side, each connected to a collector receiving part having a rib as a single part. In this case, the collector receiving part having the rib as a single part, is not directly connected to the positive electrode terminal or the negative electrode terminal but is included in the collector of the invention. The positive electrode collector and the negative electrode collector may be directly connected to the positive electrode terminal and the negative electrode terminal, respectively, or may be connected through, for example, a current interruption mechanism embedded in the path between the collector and the corresponding terminal to the positive electrode terminal and the negative electrode terminal, respectively.

In the prismatic secondary battery of the aspect, it is preferable that the leading end in the height direction of the rib of the positive electrode collector and the leading end in the height direction of the rib of the negative electrode collector protrude from the outermost surface of the flat electrode assembly toward the prismatic hollow outer body.

In the prismatic secondary battery of the aspect, it is preferable that an insulating sheet is disposed between the rib of the positive electrode collector and the prismatic hollow outer body, and between the rib of the negative electrode collector and the prismatic hollow outer body.

A prismatic secondary battery having such a structure obtains higher electrical insulation properties between the rib of the positive electrode collector and the prismatic hollow outer body and between the rib of the negative electrode collector and the prismatic hollow outer body. Hence, even when a plurality of the prismatic secondary batteries are combined and pressurized until the battery has a thickness not larger than a required thickness for containment to form a battery pack, it is even more unlikely that an internal short circuit will be caused.

The prismatic secondary battery of the invention satisfies a relation:

$$h1 \times n + h2 + h3 = H1 \times N + H2 + H3$$

where the positive electrode substrate has a thickness of $h1$, the positive electrode substrate has a stacking number of $n$, the positive electrode collector has a thickness of $h2$, the positive electrode rib has a height of $h3$, the negative electrode substrate has a thickness of $H1$, the negative electrode substrate has a stacking number of $N$, the negative electrode collector has a thickness of $H2$, and the negative electrode rib has a height of $H3$.

The prismatic secondary battery of the invention can be easily produced by arranging so that the positive electrode collector and the negative electrode collector are connected by resistance welding to the corresponding outermost surface in the stacking direction of the stacked positive electrode substrate exposed portions and the stacked negative electrode substrate exposed portions, respectively, and each leading end in the height direction of the rib of the positive electrode collector and the rib of the negative electrode collector is higher than the outermost surface of the flat electrode assembly before resistance welding followed by resistance welding of the positive electrode collector and the negative electrode collector while applying pressure with resistance welding electrodes.

In the prismatic secondary battery of the aspect, it is preferable that the rib of the positive electrode collector and the rib of the negative electrode collector are formed by folding a part of the positive electrode collector and a part of the negative electrode, respectively. Such a structure enables easy production of the positive electrode collector and the negative electrode collector.

In the prismatic secondary battery of the aspect, at least one of the positive electrode substrate exposed portion and the negative electrode substrate exposed portion may be divided into two portions, and between the portions, an intermediate member made of resin and having at least one conductive intermediate member may be interposed, the collector to be connected to the bisectional substrate exposed portion may be disposed on at least one side of the outermost surface of the bisectional substrate exposed portion, and the collector may be electrically connected to the bisectional substrate exposed portion together with the at least one conductive intermediate member of the intermediate member by resistance welding.

With the prismatic battery of the invention, even when the stacked positive electrode substrate exposed portion or the stacked negative electrode substrate exposed portion has a large thickness, the bisectional substrate exposed portion, the conductive intermediate member, and the collector can be welded by series resistance welding. In addition, when a plurality of the conductive intermediate members are provided, the conductive intermediate members are held by and fixed to the intermediate member made of resin. This improves the dimensional precision between the plurality of conductive intermediate members and enables stable positioning of the plurality of conductive intermediate members between the bisectional substrate exposed portions. As a result, the resistance-welded part obtains improved quality and a low resistivity can be achieved. Therefore, with the prismatic battery of the invention, a prismatic battery having improved output power and reduced variation in the output power can be obtained.

It is preferable that a prismatic secondary battery according to another aspect of the invention include: a prismatic hollow outer body having a mouth portion, a sealing plate for sealing up the mouth portion of the prismatic hollow outer body, and a flat electrode assembly including one end having stacked positive electrode substrate exposed portions, including another end having stacked negative electrode substrate exposed portions, and stored in the prismatic hollow outer body. A positive electrode collector including a first rib is connected to an outermost surface on one side of the stacked positive electrode substrate exposed portions and a positive electrode collector including a second rib is connected to an outermost surface on another side of the stacked positive electrode substrate exposed portions. A negative electrode collector including a third rib is connected to an outermost surface on one side of the stacked negative electrode substrate exposed portions and a negative electrode collector including a fourth rib is connected to an outermost surface on another side of the stacked negative electrode substrate exposed portions. The positive electrode collector including the first rib and the negative electrode collector including the third rib is located on the same side of the flat electrode assembly, and the positive electrode collector including the second rib and the negative electrode collector including the fourth rib is located on the same side of the flat electrode assembly. A leading end in the height direction of the first rib has approximately the same height as a leading end in the height direction of the third rib, and the leading end in the height direction of the first rib and the leading end in the height direction of the third rib protrude from the outermost surface of the flat electrode assembly toward the prismatic hollow outer body. A leading end in the height direction of the second rib and a leading end in the height direction of the fourth rib do not protrude from the outermost surface of the flat electrode assembly toward the prismatic hollow outer body.

BRIEF DESCRIPTION OF THE DRAWINGS

The invention will be described with reference to the accompanying drawings, wherein like numbers reference like elements.

DESCRIPTION OF EXEMPLARY EMBODIMENT

Hereinafter, embodiments of the invention will be described in detail with reference to the accompanying drawings. However, each embodiment described below is intended to exemplify the technical spirit of the invention, the invention is not intended to be limited to the embodiments, and the invention may equally be applied to various modified cases without departing from the technical spirit described in the claims. The prismatic secondary battery of the invention can be equally applied to a case using a flat wound electrode assembly that is obtained by winding a positive electrode sheet and a negative electrode sheet interposing a separator therebetween, and to a case using a flat stacked electrode assembly that is obtained by stacking positive electrode sheets and negative electrode sheets interposing separators therebetween. However, the flat wound electrode assembly will be described below as a typical example.

First Embodiment

Figure 1A:
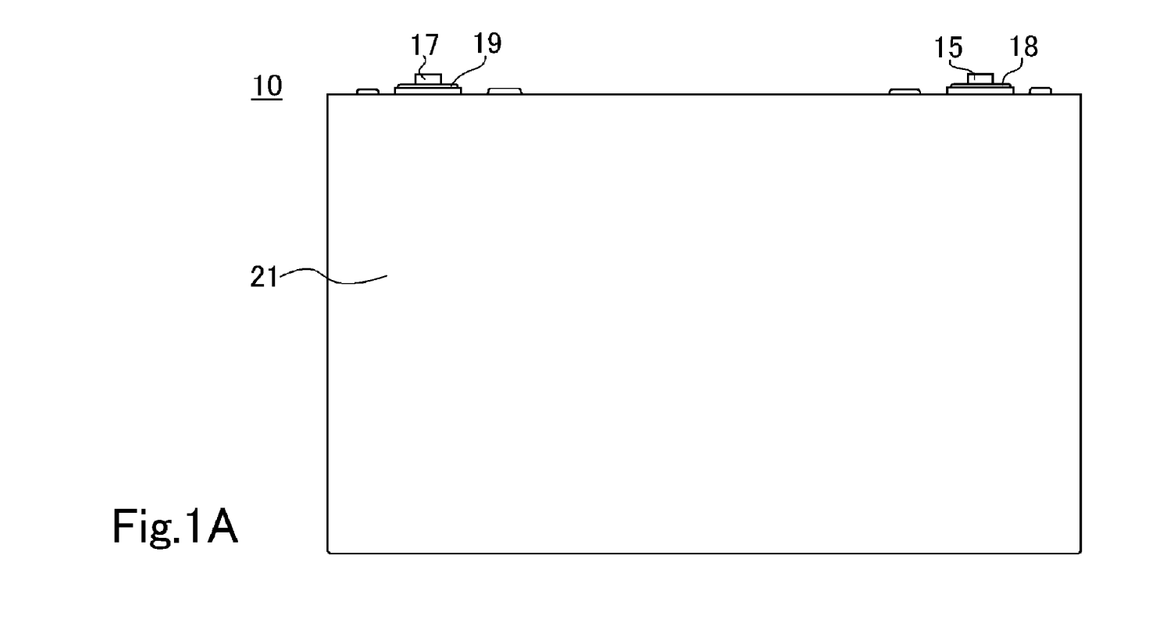
FIG. 1A is a front view of a nonaqueous electrolyte secondary battery of a first embodiment and FIG. 1B is a plan view of the nonaqueous electrolyte secondary battery.
Figure 1B:
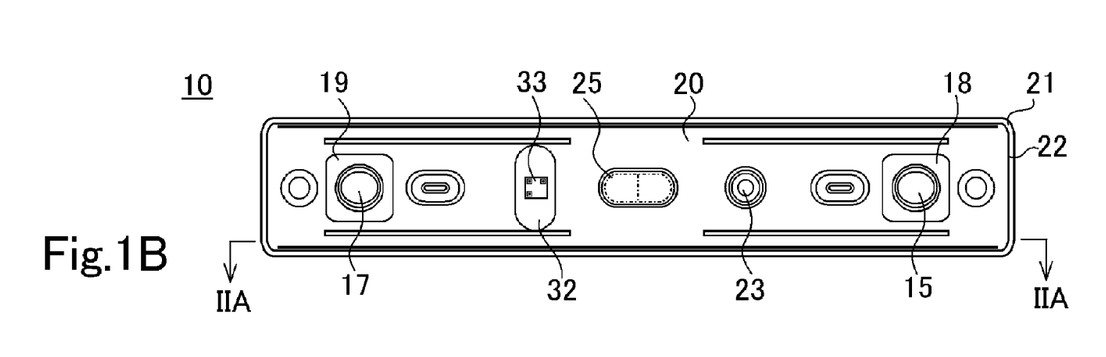
Figure 2A:
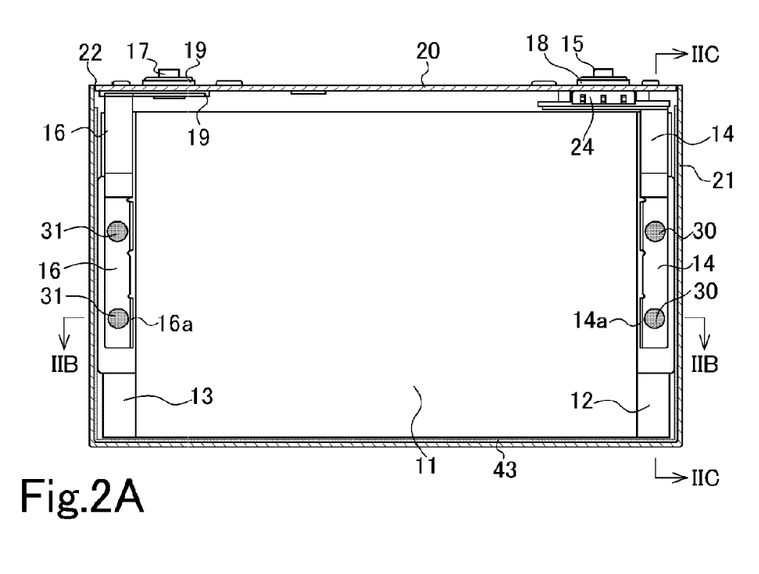
FIG. 2A is a partial sectional view taken along the line IIA-IIA in FIG. 1B.
Figure 2B:
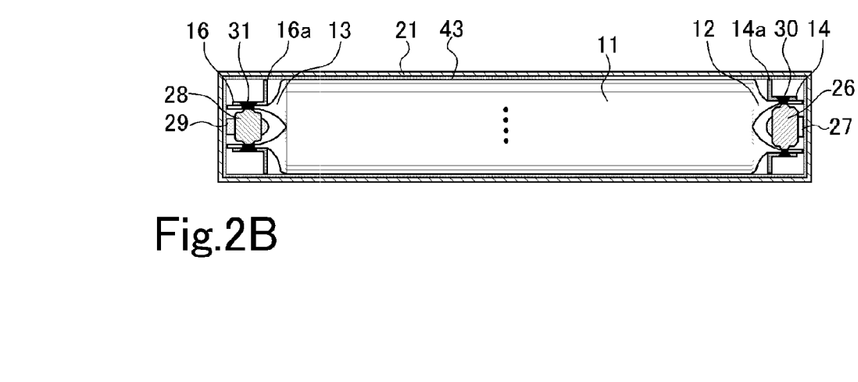
FIG. 2B is a partial sectional view taken along the line IIB-IIB in FIG. 2A.
Figure 2C:
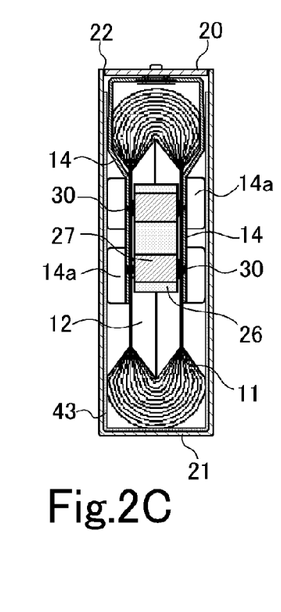
FIG. 2C is a sectional view taken along the line IIC-IIC in FIG. 2A.

Firstly, as an example of a prismatic secondary battery of First Embodiment, a prismatic nonaqueous electrolyte secondary battery will be described with reference to FIG. 1 and FIG. 2. FIG. 1A is a front view of the prismatic nonaqueous electrolyte secondary battery, and FIG. 1B is a plan view of the prismatic nonaqueous electrolyte secondary battery. FIG. 2A is a partial-sectional view taken along the line IIA-IIA in FIG. 1B, and FIG. 2B is a partial sectional view taken along the line IIB-IIB in FIG. 2A. FIG. 2C is a sectional view taken along the line IIC-IIC in FIG. 2A.

A prismatic nonaqueous electrolyte secondary battery 10 includes a flat wound electrode assembly 11 in which a positive electrode sheet and a negative electrode sheet are wound while being insulated from each other through a separator, which are not shown in the drawings. The positive electrode sheet is prepared by coating both faces of a positive electrode substrate made from aluminum foil with a positive electrode active material mixture, then drying and rolling the coated substrate, and slitting the substrate so as to expose the aluminum foil in a strip shape. Separately, the negative electrode sheet is prepared by coating both faces of a negative electrode substrate made from copper foil with a negative electrode active material mixture, then drying and rolling the coated substrate, and slitting the substrate so as to expose the copper foil in a strip shape. The positive electrode substrate is preferably made of aluminum or an aluminum alloy and preferably has a thickness of about 10 to 20 µm. The negative electrode substrate is preferably made of copper or a copper alloy and preferably has a thickness of about 5 to 15 µm.

Then, the flat wound electrode assembly 11 is prepared as follows. The positive electrode sheet and the negative electrode sheet obtained as above are stacked interposing a polyolefin microporous separator therebetween so as to displace the aluminum foil exposed portion of the positive electrode sheet and the copper foil exposed portion of the negative electrode sheet from the corresponding counter electrode active material mixtures, and the whole is wound while insulating the positive electrode sheet and the negative electrode sheet from each other through the separator to afford the flat wound electrode assembly 11 including one end with a plurality of stacked positive electrode substrate exposed portions 12 and the other end with a plurality of stacked negative electrode substrate exposed portions 13.

The plurality of stacked positive electrode substrate exposed portions 12 are electrically connected through a positive electrode collector 14 made of aluminum to a positive electrode terminal 15 also made of aluminum, and similarly, the plurality of stacked negative electrode substrate exposed portions 13 are electrically connected through a negative electrode collector 16 made of copper to a negative electrode terminal 17 also made of copper. The positive electrode terminal 15 and the negative electrode terminal 17 are, as shown in FIG. 2A and FIG. 2B, fixed to a sealing plate 20 made of, for example, aluminum through an insulating members 18 and 19, respectively. The positive electrode terminal 15 and the negative electrode terminal 17 are, as necessary, connected to an external positive electrode terminal and an external negative electrode terminal (not shown in the drawings) arranged on the insulating members 18 and 19, respectively.

The flat wound electrode assembly 11 prepared as above is wrapped with a resin sheet 43 having insulating characteristics except the sealing plate 20 side and is inserted into a prismatic hollow outer body 21 made of, for example, aluminum having an open face. Then, the sealing plate 20 is fitted to the mouth portion of the prismatic hollow outer body 21; a fitting portion 22 between the sealing plate 20 and the prismatic hollow outer body 21 is laser-welded; then, a nonaqueous electrolyte is poured from an electrolyte pour hole 23; and the electrolyte pour hole 23 is sealed up to produce the prismatic nonaqueous electrolyte secondary battery 10 of the embodiment.

A current interruption mechanism 24 that works correspondingly to the pressure of gas generated in the battery is provided between the positive electrode collector 14 and the positive electrode terminal 15. The sealing plate 20 also equips a gas release valve 25 that opens when the gas pressure becomes higher than the working pressure of the current interruption mechanism 24. Thus, the inside of the prismatic nonaqueous electrolyte secondary battery 10 is hermetically sealed. The prismatic nonaqueous electrolyte secondary battery 10 is used alone or used with a plurality of the batteries connected in series or parallel, for various applications. When a plurality of the prismatic nonaqueous electrolyte secondary batteries 10 are connected in series or parallel to be used, an external positive electrode terminal and an external negative electrode terminal are preferably provided separately for connecting each battery through bus bars so as to send a large current.

In the flat wound electrode assembly 11, as shown in FIGS. 2A to 2C, on the positive electrode sheet side, the plurality of stacked positive electrode substrate exposed portions 12 are divided into two portions, and between the portions, a positive electrode intermediate member 27 made of resin and having a plurality of positive electrode connection conductive members 26, two positive electrode connection conductive members 26 in the embodiment, is interposed. In a similar manner, on the negative electrode sheet side, the plurality of stacked negative electrode substrate exposed portions 13 are divided into two portions, and between the portions, a negative electrode intermediate member 29 made of resin and having two negative electrode connection conductive members 28 is interposed. On the outermost surface of the positive electrode substrate exposed portions 12 positioned on each side of the positive electrode connection conductive member 26, a positive electrode collector 14 is disposed, and on the outermost surface of the negative electrode substrate exposed portions 13 positioned on each side of the negative electrode connection conductive member 28, a negative electrode collector 16 is disposed. The positive electrode connection conductive member 26 is made of aluminum that is the same material as the positive electrode substrate, the negative electrode connection conductive member 28 is made of copper that is the same material as the negative electrode substrate, and the shape of the positive electrode connection conductive member 26 may be the same as or different from that of the negative electrode connection conductive member 28.

The positive electrode collector 14 is resistance-welded and connected to the positive electrode substrate exposed portion 12 (at four points), and the positive electrode substrate exposed portion 12 is resistance-welded and connected to the positive electrode connection conductive member 26 (at four points). Similarly, the negative electrode collector 16 is resistance-welded and connected to the negative electrode substrate exposed portion 13 (at four points), and the negative electrode substrate exposed portion 13 is resistance-welded and connected to the negative electrode connection conductive member 28 (at four points). FIG. 2A shows, on the positive electrode collector 14, two weld marks 30 formed by resistance welding and, on the negative electrode collector 16, two weld marks 31.

Hereinafter, in the flat wound electrode assembly 11 of the First Embodiment, the resistance welding method using the positive electrode substrate exposed portions 12, the positive electrode collector 14, and the positive electrode intermediate member 27 having the positive electrode connection conductive members 26 and the resistance welding method using the negative electrode substrate exposed portions 13, the negative electrode collector 16, and the negative electrode intermediate member 29 having the negative electrode connection conductive members 28 will be described in detail. However, in the Embodiment, the shapes of the positive electrode connection conductive member 26 and the positive electrode intermediate member 27 may be substantially the same as the shapes of the negative electrode connection conductive member 28 and the negative electrode intermediate member 29, and each resistance welding method may be substantially the same. Therefore, the method for the positive electrode sheet side will be described below as a typical example.

First, the positive electrode substrate exposed portions 12 of the flat wound electrode assembly 11 prepared as above were divided from the wound center to both side into two portions, and the divided positive electrode substrate exposed portions 12 were gathered to a center as a quarter of the thickness of the electrode assembly. Then, the positive electrode collectors 14 were disposed on both sides of the outermost periphery of the positive electrode substrate exposed portions 12, the positive electrode intermediate member 27 having the positive electrode connection conductive members 26 was inserted between both sides of the bisectional positive electrode substrate exposed portions 12 so that protrusions on both sides of the positive electrode connection conductive member 26 were in contact with the positive electrode substrate exposed portions 12 on the inner periphery thereof. The positive electrode collector 14 is made from, for example, an aluminum plate having a thickness of 0.8 mm.

Here, the positive electrode connection conductive member 26 held with the positive electrode intermediate member 27 in the First Embodiment has a column-shaped body with two opposed faces, and a protrusion (projection) having, for example, a truncated cone shape is formed on each face. The positive electrode connection conductive member 26 may have any shape, for example, a prismatic shape and an elliptical column shape, in addition to the cylindrical shape, as long as it is a metal block. Examples of the material usable for forming the positive electrode connection conductive member 26 include copper, a copper alloy, aluminum, an aluminum alloy, tungsten, and molybdenum. In addition to the members made of these metals, for example, a member having a protrusion coated with nickel or a member in which the material of a protrusion and the vicinity of a bottom of the protrusion are changed into a metal capable of accelerating heat generation, such as tungsten and molybdenum and such a protrusion is bonded to the cylindrical-shaped body of the positive electrode connection conductive member 26 made of copper, a copper alloy, aluminum, or an aluminum alloy by brazing or the like may be used.

A plurality of the positive electrode connection conductive members 26 of the First Embodiment, for example, two positive electrode connection conductive members are integrally held with the positive electrode intermediate member 27 made of a resin material. In this case, the positive electrode connection conductive members 26 are held so as to be parallel to each other. The positive electrode intermediate member 27 may have any shape, for example, a prismatic shape and a column shape. However, the shape is preferably a prismatic shape having a long lateral length in order to be fixed between the bisectional positive electrode substrate exposed portions 12 while being stably positioned. However, corners of the positive electrode intermediate member 27 are preferably chamfered so as not to scratch or deform the soft positive electrode substrate exposed portion 12 even when the corner comes into contact with the positive electrode substrate exposed portion 12. At least a part to be inserted between the bisectional positive electrode substrate exposed portions 12 may be chamfered.

The length of the prismatic positive electrode intermediate member 27 varies depending on the size of the prismatic nonaqueous electrolyte secondary battery 10, but may be 20 mm to several tens of mm. The width of the prismatic positive electrode intermediate member 27 may be substantially the same as the height of the positive electrode connection conductive member 26, but the prismatic positive electrode intermediate member 27 may have a width of which at least both ends of the positive electrode connection conductive member 26 to be welded are exposed. Both ends of the positive electrode connection conductive member 26 preferably protrude from the surface of the positive electrode intermediate member 27, but may not necessarily protrude. With such a structure, the positive electrode connection conductive member 26 is held with the positive electrode intermediate member 27 and the positive electrode intermediate member 27 is disposed between the bisectional positive electrode substrate exposed portions 12 while being stably positioned.

Next, between a pair of resistance welding electrode rods (not shown in the drawings), the positive electrode collector 14 and the flat wound electrode assembly 11 with the positive electrode intermediate member 27 holding the positive electrode connection conductive members 26 are disposed. The pair of the resistance welding electrode rods are brought into contact with the positive electrode collectors 14 disposed on both outermost periphery sides of the positive electrode substrate exposed portions 12. Then, an appropriate pressure is applied between the pair of the resistance welding electrode rods to perform resistance welding in a previously determined constant condition. During the resistance welding, the positive electrode intermediate member 27 is disposed while being stably positioned between the bisectional positive electrode substrate exposed portions 14. This improves the dimensional precision between the positive electrode connection conductive member 26 and the pair of electrode rods, enables the resistance welding in an exact and stable condition, and can suppress variation in the welding strength.

Figure 3:
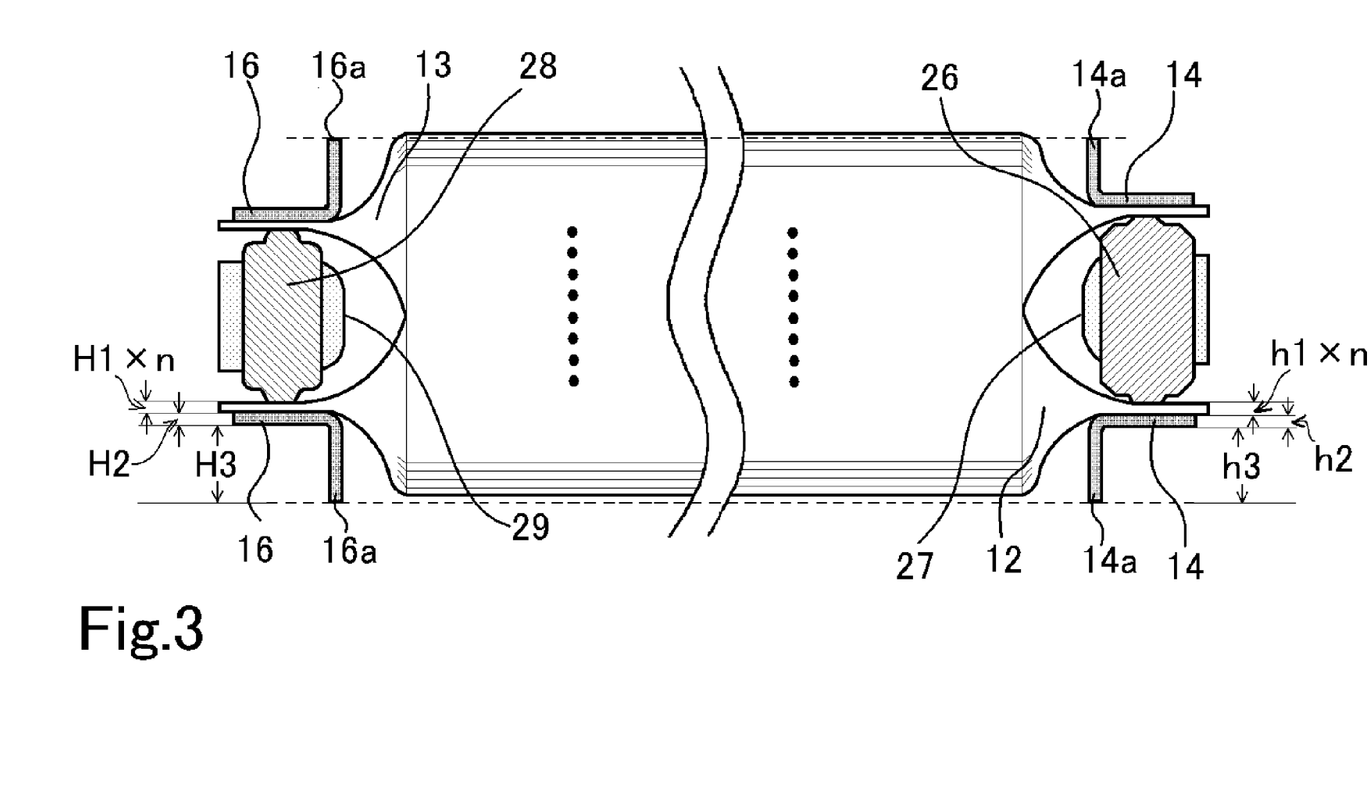
FIG. 3 is an enlarged view of FIG. 2B.

Next, the specific structures of the positive electrode collector 14 and the negative electrode collector 16 of the invention will be described with reference to FIG. 3. FIG. 3 is an enlarged view of FIG. 2B.

As shown in FIG. 2A and FIG. 2B, the positive electrode collector 14 is electrically connected to the plurality of stacked positive electrode substrate exposed portions 12 that are disposed on one edge side of the flat wound electrode assembly 11 by resistance welding. The positive electrode collector 14 is also electrically connected to the positive electrode terminal 15. Similarly, the negative electrode collector 16 is electrically connected to the plurality of stacked negative electrode substrate exposed portions 13 that are disposed on the other edge side of the flat wound electrode assembly 11 by resistance welding. The negative electrode collector 16 is also electrically connected to the negative electrode terminal 17.

The positive electrode collector 14 is prepared by, for example, punching out an aluminum plate into a predetermined shape and then folding the plate. The positive electrode collector 14 includes a main body and a rib 14a, the main body is a portion to be resistance-welded to the bundled positive electrode substrate exposed portions 12, and the rib 14a is formed on the main body. The negative electrode collector 16 is prepared by, for example, punching out a copper plate into a predetermined shape and then folding the plate. The negative electrode collector 16 also includes a main body and a rib 16a, the main body is a portion to be resistance-welded to the bundled negative electrode substrate exposed portions 13, and the rib 16a is formed on the main body.

Both the rib 14a of the positive electrode collector 14 and the rib 16a of the negative electrode collector 16 have a role as a shield so that spattered particles generated during resistance welding do not spatter into the flat wound electrode assembly 11, and a role as a radiation fin so that heat generated during resistance welding does not melt any area except the resistance welding areas in the positive electrode collector 14 and the negative electrode collector 16. The ribs 14a and 16a are formed perpendicular to the main bodies of the positive electrode collector 14 and the negative electrode collector 16, respectively. However, each rib is not necessarily perpendicular and may be tilted by about ±10° for providing a similar advantageous effect.

Here, the size relation of the rib 14a of the positive electrode collector 14 and the rib 16a of the negative electrode collector 16 before and after resistance welding will be described.

First, as shown in FIG. 3, the positive electrode substrate has a thickness of h1, the positive electrode substrate has a stacking number of n, the positive electrode collector has a thickness of h2, the positive electrode rib has a height of h3, the negative electrode substrate has a thickness of H1, the negative electrode substrate has a stacking number of N, the negative electrode collector has a thickness of H2, and the negative electrode rib has a height of H3. For example, an aluminum foil having a thickness h1=15 μm is used as the positive electrode substrate, while a copper foil having a thickness H1=10 μm is used as the negative electrode substrate. The positive electrode sheet is prepared by forming a positive electrode mixture layer containing, for example, lithium cobalt oxide as a positive electrode active material on each face of the aluminum foil. The negative electrode sheet is prepared by forming a negative electrode mixture layer containing, for example, graphite as a negative electrode active material on each face of the copper foil.

In the flat wound electrode assembly 11, the winding number of the positive electrode sheet may be different from the winding number of the negative electrode sheet because one of the sheets may be wound a larger number of times than the other at the start of winding or the end of winding. Thus, the stacking number n of the positive electrode substrate exposed portion 12 may be different from the stacking number N of the negative electrode substrate exposed portion 13, but the difference is small. In the nonaqueous electrolyte secondary battery 10 of First Embodiment, the leading end in the height direction of the rib 14a of the positive electrode collector 14 has the same height as the leading end in the height direction of the rib 16a of the negative electrode collector 16 after resistance welding. It is required that the positive electrode collector 14 made of aluminum has a larger thickness h2 than the thickness H2 of the negative electrode collector 16 made of copper, that is, the relation h2>H2 is satisfied, from the viewpoint of mechanical strength.

As a result, in the nonaqueous electrolyte secondary battery 10 of First Embodiment, the height h3 of the rib 14a of the positive electrode collector 14 and the height H3 of the rib 16a of the negative electrode collector 16 are designed so as to satisfy the relation h1×n+h2+h3=H1×N+H2+H3. From the relation, the nonaqueous electrolyte secondary battery 10 of First Embodiment satisfies the relation h3<H3 because the relations h1>H1, n≈N, and h2>H2 are satisfied. In other words, the height h3 of the rib 14a of the positive electrode collector 14 is consistently smaller than the height H3 of the rib 16a of the negative electrode collector 16.

In contrast, before resistance welding, the stacked positive electrode substrate exposed portions 12 and the stacked negative electrode substrate exposed portions 13 are not pressurized, resulting in clearance between respective substrate exposed portions, thereby making increasing the apparent thickness. Accordingly, before resistance welding, each leading end in the height direction of the rib 14a of the positive electrode collector 14 and the rib 16a of the negative electrode collector 16 is positioned at a higher position than that of the outermost surface of the flat wound electrode assembly 11. Then, during resistance welding, a pair of resistance welding electrodes are brought into contact with the main bodies of the positive electrode collectors 14 that are disposed on the respective sides of the stacked positive electrode substrate exposed portions 12, and resistance welding is performed while pressurizing the pair of resistance welding electrodes to each other. In a similar manner, a pair of resistance welding electrodes are brought into contact with the main bodies of the negative electrode collectors 16 that are disposed on the respective sides of the stacked negative electrode substrate exposed portions 13, and resistance welding is performed while pressurizing the pair of resistance welding electrodes to each other. As a result, after resistance welding, the leading end in the height direction of the rib 14a of the positive electrode collector 14 has approximately the same height as the leading end in the height direction of the rib 16a of the negative electrode collector 16. In this case, it is preferable that each leading end in the height direction of the rib 14a of the positive electrode collector 14 and the rib 16a of the negative electrode collector 16 slightly protrude from the outermost surface of the flat wound electrode assembly 11 toward the prismatic hollow outer body 21 on one side, and be slightly recessed from the outermost surface of the flat wound electrode assembly 11 on the other side.

When a plurality of the nonaqueous electrolyte secondary batteries 10 having such a structure of First Embodiment are combined and are pressurized until the battery has a thickness not larger than a required thickness for containment to form a battery pack in a similar manner to the related art example above, each nonaqueous electrolyte secondary battery 10 is uniformly depressed and the deformation is suppressed. Accordingly, the produced battery pack is likely to have a uniform length. As a result, a battery pack with stable quality can be obtained.

In the prismatic nonaqueous electrolyte secondary battery 10 of First Embodiment, both the rib 14a of the positive electrode collector 14 and the rib 16a of the negative electrode collector 16 are provided at two positions corresponding to the resistance-welded positions in the longitudinal direction as a non-limited example. The rib may be provided at a position, or a collector having ribs on both ends in the width direction may be used. When such a collector having ribs on both ends in the width direction is used, the ribs may have the same height or different heights from each other. When the heights are different from each other, a portion around the flat wound electrode assembly 11 preferably has a larger height.

Second Embodiment

In the nonaqueous electrolyte secondary battery 10 of First Embodiment, both the plurality of stacked positive electrode substrate exposed portions 12 and the plurality of stacked negative electrode substrate exposed portions 13 are divided into two portions, and the positive electrode intermediate member 27 having the positive electrode connection conductive member 26 or the negative electrode intermediate member 29 having the negative electrode connection conductive member 28 is interposed between the portions, as an example. However, the invention can provide a similar advantageous effect when the positive electrode collector 14 or the negative electrode collector 16 is directly welded to a plurality of stacked positive electrode substrate exposed portions 12 or a plurality of stacked negative electrode substrate exposed portions 13 that are not divided into two portions.

Figure 4:
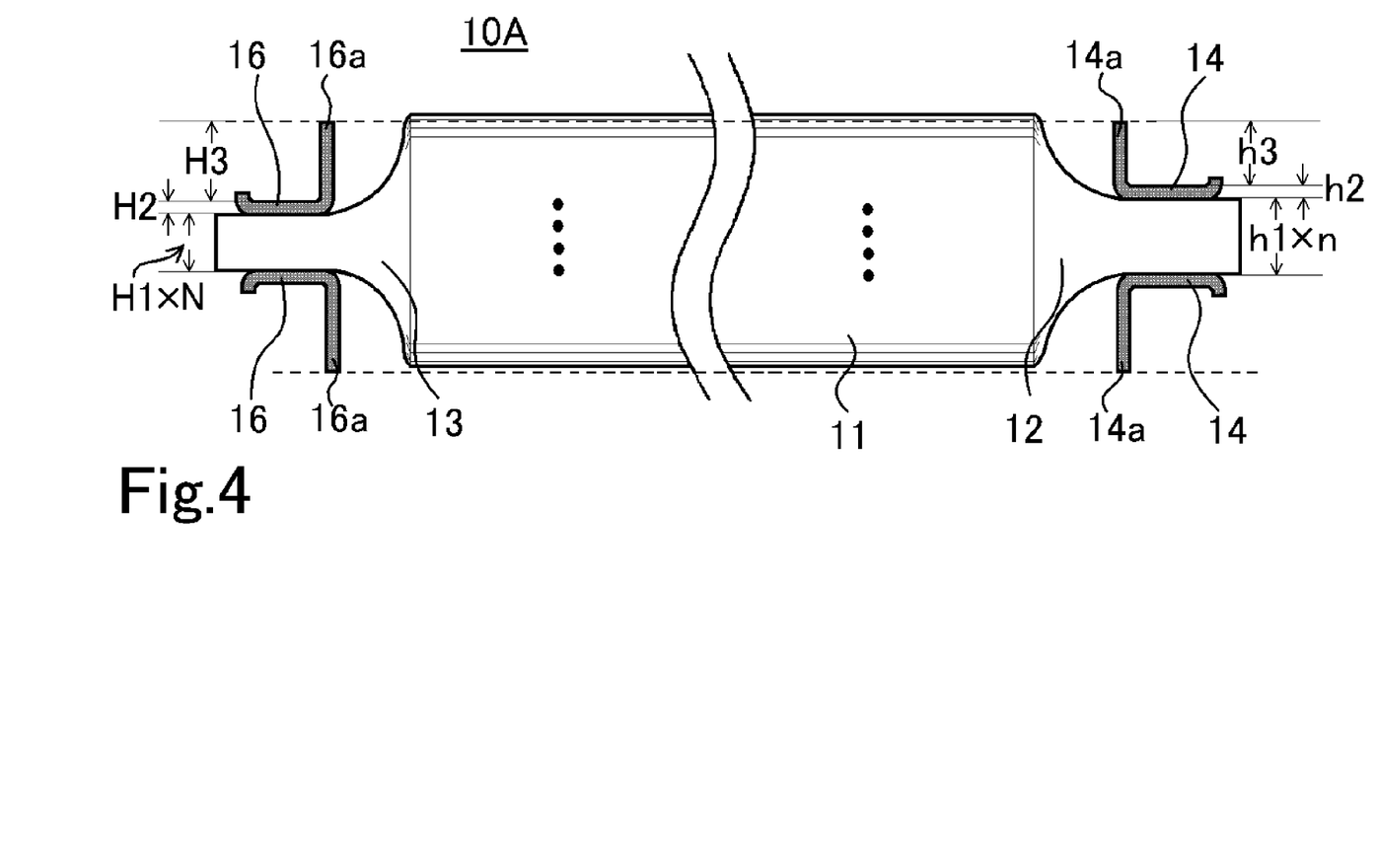
FIG. 4 is an enlarged view of a part in a nonaqueous electrolyte secondary battery of a second embodiment corresponding to FIG. 2B.

A nonaqueous electrolyte secondary battery 10A having such a structure of Second Embodiment will be described with reference to FIG. 4. FIG. 4 is an enlarged view of a part in the nonaqueous electrolyte secondary battery 10A of Second Embodiment corresponding to FIG. 2B. In FIG. 4, the prismatic hollow outer body 21 and the insulating resin sheet 43 are not shown in the drawings, and the same components as those of the nonaqueous electrolyte secondary battery 10 of First Embodiment are shown by the same reference characters and are not described in detail.

The prismatic nonaqueous electrolyte secondary battery 10A of Second Embodiment does not include the positive electrode connection conductive member 26, the positive electrode intermediate member 27, the negative electrode connection conductive member 28, and the negative electrode intermediate member 29 that are used in the nonaqueous electrolyte secondary battery 10 of First Embodiment because both the stacked positive electrode substrate exposed portions 12 and the stacked negative electrode substrate exposed portions 13 are not divided into two portions. The prismatic nonaqueous electrolyte secondary battery 10A of Second Embodiment also satisfies the relation h1×n+h2+h3=H1×N+H2+H3, where the positive electrode substrate has a thickness of h1, the positive electrode substrate has a stacking number of n, the positive electrode collector has a thickness of h2, the positive electrode rib has a height of h3, the negative electrode substrate has a thickness of H1, the negative electrode substrate has a stacking number of N, the negative electrode collector has a thickness of H2, and the negative electrode rib has a height of H3. The relation h3<H3 is also satisfied because the relations h1>H1, n≈N, and h2>H2 are satisfied. Therefore, the height h3 of the rib 14a of the positive electrode collector 14 is consistently smaller than the height H3 of the rib 16a of the negative electrode collector 16. The nonaqueous electrolyte secondary battery 10A of Second Embodiment can also provide a similar advantageous effect to the nonaqueous electrolyte secondary battery 10 of First Embodiment.

Third Embodiment

In the prismatic nonaqueous electrolyte secondary battery 10 of First Embodiment and the prismatic nonaqueous electrolyte secondary battery 10A of Second Embodiment, the positive electrode collector 14 on which the rib 14a is integrally formed and the negative electrode collector 16 on which the rib 16a is integrally formed are used as the positive electrode collector 14 and the negative electrode collector 16 that are resistance-welded to each outer surface of the positive electrode substrate exposed portion 12 and each outer surface of the negative electrode substrate exposed portion 13, respectively, as an example. However, the positive electrode collector 14 and the negative electrode collector 16 may, on one side of the respective stacked substrate exposed portions 12 and 13, each have a collector main body connected to the positive electrode terminal 15 and the negative electrode terminal 17, respectively, and a rib; and may be, on the other side, each connected to a collector receiving part having a rib as a single part.

Figure 5:
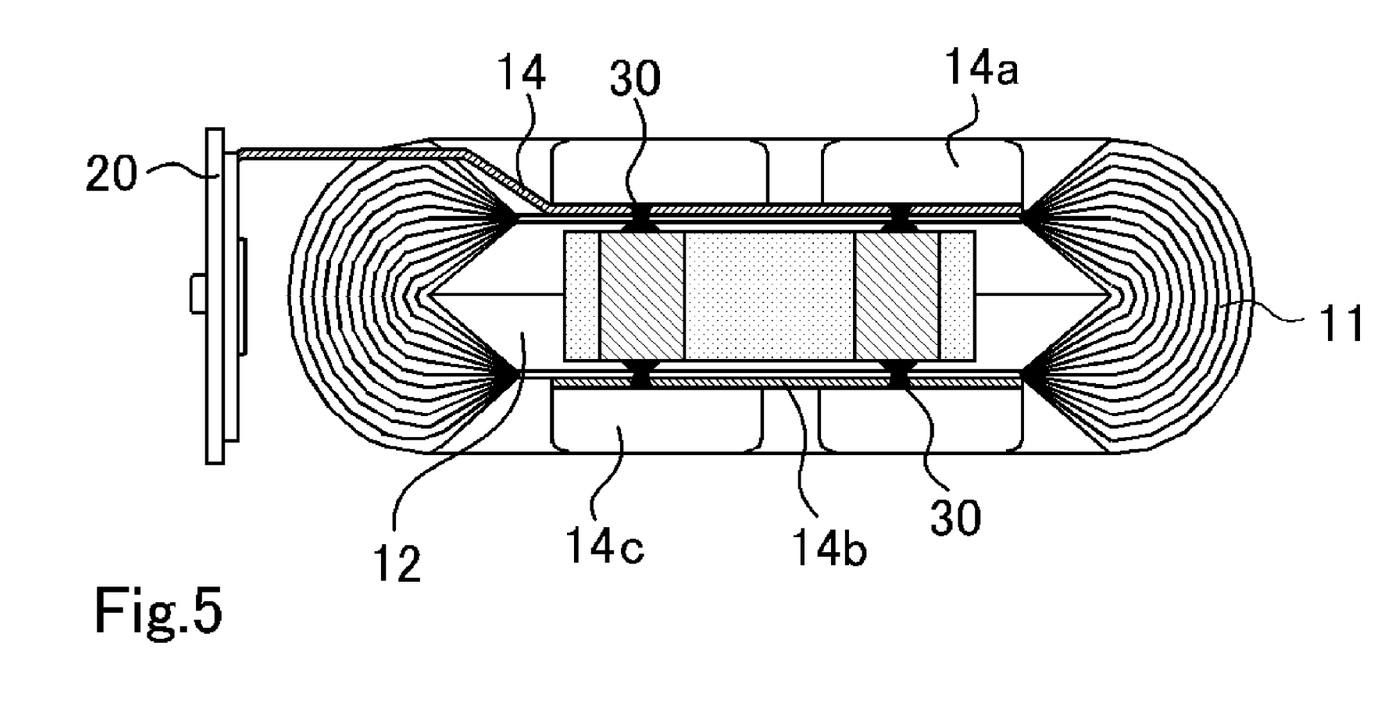
FIG. 5 is a cross-sectional view of a part of a prismatic nonaqueous electrolyte secondary battery of a third embodiment corresponding to FIG. 2C.

A prismatic nonaqueous electrolyte secondary battery 10B having such a structure of Third Embodiment will be described with reference to FIG. 5. FIG. 5 is an enlarged view of a part in the nonaqueous electrolyte secondary battery 10B of Third Embodiment corresponding to FIG. 2C. In FIG. 5, the prismatic hollow outer body 21 and the insulating resin sheet 43 are not shown in the drawings, and the same components as those of the nonaqueous electrolyte secondary battery 10 of First Embodiment are shown by the same reference characters and are not described in detail.

In the prismatic nonaqueous electrolyte secondary battery 10B of Third Embodiment, the positive electrode collector 14 and the negative electrode collector 16 that are resistance-welded onto one respective outer surfaces of the positive electrode substrate exposed portion 12 and the negative electrode substrate exposed portion 13 are directly electrically connected to the positive electrode terminal 15 and the negative electrode terminal 17, respectively, arbitrarily through the current interruption mechanism 24 (see FIG. 2A). However, a positive electrode collector receiving part 14b and a negative electrode collector receiving part (not shown in the drawings) that are resistance-welded onto the respective other outer surfaces of the positive electrode substrate exposed portion 12 and the negative electrode substrate exposed portion 13 are independent parts and are not directly electrically connected to the positive electrode terminal 15 and the negative electrode terminal 17, respectively. The positive electrode collector receiving part 14b has a rib 14c, while the negative electrode collector receiving part also has a rib. The rib 14c of the positive electrode collector receiving part 14b has the same height as the height of the rib 14a of the positive electrode collector 14, while the rib of the negative electrode collector receiving part also has the same height as the height of the rib 16a of the negative electrode collector 16. The prismatic nonaqueous electrolyte secondary battery 10B of Third Embodiment satisfies the same size relation as that in the nonaqueous electrolyte secondary battery 10 of First Embodiment, and the prismatic nonaqueous electrolyte secondary battery 10B of Third Embodiment can provide a similar advantageous effect to the nonaqueous electrolyte secondary battery 10 of First Embodiment. Third Embodiment may employ a structure without the positive electrode connection conductive member 26 or the negative electrode connection conductive member 28, like Second Embodiment.

The embodiment describes the prismatic nonaqueous electrolyte secondary battery as an example of the prismatic secondary battery. However, the invention is also applicable to a prismatic secondary battery using an aqueous electrolyte, such as a nickel-hydrogen secondary battery.

What is claimed is:
1. A prismatic secondary battery comprising:
a prismatic hollow outer body having a mouth portion;
a sealing plate for sealing up the mouth portion of the prismatic hollow outer body; and
a flat electrode assembly including one end having stacked positive electrode substrate exposed portions, including another end having stacked negative electrode substrate exposed portions, and stored in the prismatic hollow outer body;
a positive electrode collector including a first rib being connected to an outermost surface on one side of the stacked positive electrode substrate exposed portions and a positive electrode collector including a second rib being connected to an outermost surface on another side of the stacked positive electrode substrate exposed portions,
a negative electrode collector including a third rib being connected to an outermost surface on one side of the stacked negative electrode substrate exposed portions and a negative electrode collector including a fourth rib being connected to an outermost surface on another side of the stacked negative electrode substrate exposed portions,
the positive electrode collector including the first rib and the negative electrode collector including the third rib being located on the same side of the flat electrode assembly, and the positive electrode collector including the second rib and the negative electrode collector including the fourth rib being located on the same side of the flat electrode assembly, the difference between the leading end in the height direction of the first rib and the leading end in the height direction of the third rib being within 0.1 mm, and the leading end in the height direction of the first rib and the leading end in the height direction of the third rib protruding from the outermost surface of the flat electrode assembly toward the prismatic hollow outer body, and a leading end in the height direction of the second rib and a leading end in the height direction of the fourth rib not protruding from the outermost surface of the flat electrode assembly toward the prismatic hollow outer body.

2. The prismatic secondary battery according to claim 1, wherein an insulating sheet disposed between the first and second ribs of the positive electrode collector and the prismatic hollow outer body and between the third and fourth ribs of the negative electrode collector and the prismatic hollow outer body.

3. The prismatic secondary battery according to claim 2, wherein at least one of the stacked positive electrode substrate exposed portion and the stacked negative electrode substrate exposed portion may be divided into two portions, and between the portions, an intermediate member made of resin and having at least one conductive intermediate member may be interposed, the collector to be connected to the bisectional substrate exposed portion disposed on at least one side of an outermost surface of the bisectional substrate exposed portion, and the collector electrically connected to the bisectional substrate exposed portion together with the at least one conductive intermediate member of the intermediate member by resistance welding.

4. The prismatic secondary battery according to claim 3, wherein the first rib and the second rib of the positive electrode collector and the third rib and the fourth rib of the negative electrode collector are formed by folding a part of the positive electrode collector and a part of the negative electrode, respectively.

5. The prismatic secondary battery according to claim 1, wherein the positive electrode collector and the negative electrode collector are connected by resistance welding to the corresponding outermost surface in the stacking direction of the stacked positive electrode substrate exposed portions and the stacked negative electrode substrate exposed portions, respectively, and each leading ends in the height direction of the first rib and the second rib of the positive electrode collector and the third rib and the fourth rib of the negative electrode collector is higher than the outermost surface of the flat electrode assembly before resistance welding.

6. The prismatic secondary battery according to claim 1, wherein the rib of the positive electrode collector and the rib of the negative electrode collector are formed by folding a part of the positive electrode collector and a part of the negative electrode, respectively.

7. The prismatic secondary battery according to claim 1, wherein at least one of the stacked positive electrode substrate exposed portion and the stacked negative electrode substrate exposed portion may be divided into two portions, and between the portions, an intermediate member made of resin and having at least one conductive intermediate member may be interposed, the collector to be connected to the bisectional substrate exposed portion disposed on at least one side of an outermost surface of the bisectional substrate exposed portion, and the collector electrically connected to the bisectional substrate exposed portion together with the at least one conductive intermediate member of the intermediate member by resistance welding.

8. The prismatic secondary battery according to claim 7, wherein an insulating sheet disposed between the first and second ribs of the positive electrode collector and the prismatic hollow outer body and between the third and fourth ribs of the negative electrode collector and the prismatic hollow outer body.

9. The prismatic secondary battery according to claim 8, wherein the first rib and the second rib of the positive electrode collector and the third rib and the fourth rib of the negative electrode collector are formed by folding a part of the positive electrode collector and a part of the negative electrode, respectively.

10. The prismatic secondary battery according to claim 1, wherein the positive electrode collector including the first rib and the positive electrode collector including the second rib are integrally formed as one unit, and the negative electrode collector including the third rib and the negative electrode collector including the fourth rib are integrally formed as one unit.

11. The prismatic secondary battery according to claim 10, wherein at least one of the stacked positive electrode substrate exposed portion and the stacked negative electrode substrate exposed portion may be divided into two portions, and between the portions, an intermediate member made of resin and having at least one conductive intermediate member may be interposed, the collector to be connected to the bisectional substrate exposed portion disposed on at least one side of an outermost surface of the bisectional substrate exposed portion, and the collector electrically connected to the bisectional substrate exposed portion together with the at least one conductive intermediate member of the intermediate member by resistance welding.

* * * * *